United States Patent

Hiratsuka

[11] Patent Number: 5,907,414
[45] Date of Patent: May 25, 1999

[54] COLOR IMAGE PROCESSING APPARATUS

[75] Inventor: Seiichiro Hiratsuka, Kitakyushu, Japan

[73] Assignee: Matsushita Electric Industrial Co., Ltd., Osaka, Japan

[21] Appl. No.: 08/573,588

[22] Filed: Dec. 15, 1995

Related U.S. Application Data

[63] Continuation of application No. 08/233,436, Apr. 28, 1994, abandoned.

[30] Foreign Application Priority Data

Apr. 28, 1993 [JP] Japan ................................. 5-102600

[51] Int. Cl.$^6$ ....................................................... H04N 1/46
[52] U.S. Cl. ............................ 358/513; 358/504; 358/482
[58] Field of Search ..................................... 358/501, 504, 358/505, 513, 514, 515, 524, 471, 474, 482, 483

[56] References Cited

U.S. PATENT DOCUMENTS 5,321,529  6/1994  Funada .................................... 358/500
5,357,353  10/1994  Hirota ..................................... 358/518

Primary Examiner—Thomas D. Lee
Attorney, Agent, or Firm—McDermott, Will & Emery

[57] ABSTRACT

A color image processor that corrects a color image signal for the disagreement of images caused by the vibration of the image sensor when scanning a manuscript. The image sensor delivers an image signal that includes three signals, each one representing the level of brightness of one of the primary colors contained on the scanned image. Each signal includes a discrete value for each pixel reading the sensor and hence, comprises the brightness levels for a plurality of pixels. One of the three signals is called a standard color signal; the other two are called non-standard color signals. Each of the brightness levels of a non-standard color signal is sequentially stored in a register array. Individual levels of the pixels in the register array are examined to determine whether a pixel exists at an edge portion of a letter image. A pixel that exists at an edge portion is called a correction objective pixel. Various detectors connected to the register array are used to determine whether a pixel is a correction objective pixel. If a pixel is determined to be a correction objective pixel, the levels of brightness of neighboring pixels together with the level of brightness of the standard color pixel corresponding to the correction objective pixel are used to calculate a correction factor, which factor is used to adjust the level of brightness of the correction objective pixel. By adjusting the value of the level of brightness of the correction objective pixel of the non-standard color pixels the image signal is corrected for unwanted movements of the image sensor.

2 Claims, 3 Drawing Sheets

COLOR IMAGE PROCESSING APPARATUS

This is a continuation application of application Ser. No. 08/233,436, filed Apr. 28, 1994, now abandoned.

FIELD OF THE INVENTION

The present invention relates to a color image processing apparatus for correcting differences in the levels of brightness of the colors of an image due to unwanted movements of a color image sensor.

BACKGROUND OF THE INVENTION

Color image scanners for reading or scanning color manuscripts into the data base of a host computer are becoming widely used. Color image scanners operate by scanning a color manuscript, resolving or separating the signals from the scanned manuscript into the primary colors and outputting a digitalized image signal to the computer.

A manuscript to be scanned may be thought of as being broken up into a rectangular grid of horizontal lines or rows and vertical columns, filling the area to be scanned The rectangular grid forms a plurality of elemental areas, elemental images, portions or pixels on the manuscript.

FIG. 1B is a representation of an image sensor 9 used to scan or read the lines or rows of elemental areas elemental images or pixels of a color manuscript. The image sensor 9 has three lines or rows of reading sensors in the form of charge-coupled-devices (CCDs) (not shown), with each line having a CCD for each elemental area or pixel. Each CCD in a line of CCDs delivers an image signal corresponding to the levels of brightness of the pixels read by the CCD. Each line of CCDs responds to different colors in the pixel and delivers image signals in terms of the level of brightness of a particular color contained in the pixels Each line of CCDs reads or scans the line of pixels and delivers image signals in terms of the level of brightness of the green, blue or red colors contained in the line of pixels read by a line of CCDs. As depicted in FIG. 1B, the three lines of CCDs are identified as G, B, and R, respectively. The G line of CCDs delivers image signals representing the level of brightness of the color green. The B line of CCDs delivers image signals representing the level of brightness of the color blue. The R line of CCDs delivers image signals representing the brightness of the color red.

In scanning a color manuscript, the optical box 5 (FIG. 1A) with the image sensor 9 therein, is moved relative to the manuscript 2 in the direction of the Y' arrow. As the optical box 5 is moved in the Y' direction, the three lines of CCDs sweep the manuscript 2. The direction of the Y arrow is called the subsidiary sweep directions The CCDs in each line sweep, scan, or read the manuscript sequentially in the direction of the X arrow. The direction of the X arrow is called the main sweep direction. Each CCD delivers an image signal representing the level of brightness of a primary color contained in the pixel read by the CCD.

As shown in FIG. 1B, the three lines of CCDs are displaced from each other in the direction of the Y arrow or subsidiary sweep direction. Accordingly, in using the image sensor 9 to scan a color manuscript, each line of CCDs will read different lines of pixels on the manuscript at the same time. The CCDs in each line deliver the image signals sequentially, sweeping across a line of pixels in the X direction. While sweeping in the X direction, three CCDs in the same column deliver image signals concurrently. Specifically, at the time a CCD in the G line delivers an image signal representing the brightness of the primary color green in the pixel on the manuscript read by the CCD, another CCD in the B line, located in the same column as the CCD in the G line, delivers an image signal representing the brightness of the primary color blue in the pixel on the manuscript read by the CCD in the B line. In addition, the CCD in the R line, located in the same column as the CCD in the G line and the CCD in the B line, delivers an image signal at the same time as the other two image signals, representing the brightness of the primary color red in the pixel on the manuscript read by the CCD in the R line. The scan or sweep process is repeated line by line, top to bottom, until the complete manuscript is scanned.

Since the three CCDs, as discussed above, are displaced from one another and hence, deliver image signals from different pixels on the manuscript, simply combining the three image signals would not provide a meaningful three-color image signal. However, a meaningful three-color image signal can be provided by collecting the image signals delivered by respective CCDs taken consecutively of the same pixel.

For instance, assume that the displacement between the lines of CCDs is equal to 10 lines of horizontal sweep. Then, when the CCDs in the G line are scanning a line of pixels, the CCDs in the B line are scanning a line of pixels 10 lines above the line of pixels being scanned by the G line of CCDs.

For the sake of this example, assume that the G line of CCDs is scanning the 60th line of the manuscript. Then, the B line of CCDs is scanning the 50th line and the R line of CCDs is scanning the 40th line of the manuscript, simultaneously with the G line of CCDs.

In order to provide a meaningful three-color image signal that includes image signals from the same pixel, the following steps are taken:

(1) The image signals delivered by the G line of CCDs scanning the 60th line are sequentially stored in a memory device.

(2) As the image sensor 9 moves in the Y' direction (FIG. 1A), the image signals delivered by the B line of CCDs scanning the 60th line are also sequentially stored in a memory device.

(3) As the image sensor 9 moves further in the Y' direction, image signals are sequentially delivered by the R line of CCDs scanning the 60th line.

(4) As the image signals are sequentially delivered by the R line of CCDs scanning the 60th line, the G and B image signals for the 60th line, stored in the respective memory devices, are sequentially read out from the memory devices.

(5) The image signals read out from the memory devices are collected with the corresponding image signals being delivered by the R line of CCDs scanning the 60th line to compose a three-color image signal for each pixel on the 60th line of the color manuscript.

This method of obtaining a three-color image signal of a pixel that includes image signals delivered by different CCDs reading the same pixel at different times is called the correction for the "displacement" of CCDs. Correction for the displacement of CCDs to provide a three-color image signal is a relatively straight forward matter since the displacement between each row of CCDs is known as equal to 10 lines of horizontal sweep.

The invention described herein is directed at another correction. This invention is directed to correcting the problem caused when CCDs, reading the same pixel, are not in the same reading position relative to each other. Sometimes a CCD fails to be in the correct position relative to a pixel at the time the CCD reads the level of brightness of a primary color of the pixels The level of brightness read from the same pixel by the respective G, B, and R CCDs is supposed to be almost the same. The brightness level of a pixel is not dependent on color. Rather, the level of brightness read by a CCD is dependent on the level of brightness of the color of the pixel being read. Hence, if the CCDs are positioned differently relative to each other in reading a pixel, the CCDs may deliver image signals with different levels of brightness, since the CCDs are in effect reading different pixels. The problem is that an improperly-positioned CCD may deliver an image signal that misrepresents the level of brightness of a primary color in the pixel being read. When the three image signals are collected to form a three-color image signal of the pixel, the resulting three-color-image signal may also be inaccurate. This problem is referred to as the "disagreement of images." As will be described hereafter, the problem caused by the disagreement of images is more pronounced when the pixel exists at the edge portion of an image.

The movement of a CCD from the correct reading position can arise for a variety of reasons. One source of movement can be vibration, wherein the image sensor 9 is caused to vibrate. Another source of movement could be a shock induced movement of an image sensor. Spurious or unwanted movements of an image sensor can result in a disagreement of images in either the main sweep direction or the subsidiary sweep direction, or in both directions.

The effect of vibrating an image sensor may cause the CCDs to move from their proper position relative to the line, row of elemental images, or pixels being read. An example of what may take place will now be described in terms of a pixel in the 60th line of the manuscript being scanned.

First, assume a CCD in the G line of CCDs has been vibrated in the X or main sweep direction and as a result, is displaced 0.1 pixels to the right from the correct reading position relative to the read pixel Next, assume that the B line of CCDs has been vibrated, also in the X direction, at the time a B line CCD reads the same pixel in the 60th line and as a result, is displaced 0.2 pixels to the left. The effect of such movements in the X direction results in a disagreement of 0.3 pixels between the pixel reading by the G line CCD and the reading by the B line CCD. As described hereafter, with reference to FIG. 3B, such a disagreement of pixels or images will result in image signals being delivered by the G line CCD and the B line CCD having different levels of brightness for the same pixels.

As for the movement of the image sensor 9 in the Y or subsidiary sweep direction, assume a CCD in the G line of CCDs has been vibrated in the Y or subsidiary sweep direction and as a result, been displaced +0.1 lines in the subsidiary sweep direction from the correct reading position relative to the pixel. Next, assume that the B line of CCDs has been vibrated, also in the Y direction, at the time a B line CCD is reading the same elemental image in the 60th line and as a result, been displaced –0.2 lines in the subsidiary sweep direction. The effect of such movements in the Y direction results in a disagreement of 0.3 lines between the pixel read by the G line CCD and the same pixel read by the B line CCD.

The disagreement of images causes more of a problem when the elemental image being read exists at the edge portion, where the level of brightness changes abruptly. Such portions are usually the edge portion of a letter, the image of a letter, or the image of a mark. On the other hand, the disagreement of images causes less of a problem where the image is an image in which the brightness level changes slowly.

In order to illustrate the effect on image signals delivered by an image sensor that has vibrated, in the main sweep direction, in reading pixels that exist at an edge portion, reference is made to FIG. 3A and FIG. 3B.

FIG. 3A and FIG. 3B depict a small portion of manuscript in the form of several pixels of a letter image. One of the pixels exists at the edge portion of the letter image. Several other pixels, adjacent the pixel that exists at the edge portion of the letter, are also shown. FIG. 3A and FIG. 3B show the brightness levels of the pixels obtained with the letter image perpendicular to the main sweep direction. Two levels of brightness are shown: one delivered by a R (red) reading sensor and another delivered by a G (green) reading sensor.

In particular, FIG. 3A depicts the instance where the R and G reading sensors are positioned in the same reading position relative to the pixels. There is no disagreement of images in the FIG. 3A depiction. Hence, both brightness levels delivered by the R and G reading sensors are almost the same.

On the other hand, FIG. 3B depicts the instance where the R and G reading sensors are moved relative to each other in the main sweep direction in reading the same pixels. FIG. 3B represents the disagreement of images situation. In this situation, the brightness levels delivered from the pixels are different, especially from the pixel that exists at the edge portion, where the red and green brightness levels are largely different. Both brightness levels in the R image and in the G image are largely different at the edge portions resulting in a color displacement at the edge portion. Color displacement means a disagreement of images in different colors.

The method described above to correct the displacement of the CCDs cannot be used to correct the problem caused by the displacement of images.

Also, the countermeasure which gives gray balance to the edge portion is unsuitable to correct the problem caused by the disagreement of images since gray balance cannot be used for a color image.

Moreover, corrections for the problem caused by the disagreement of images is not easy since the disagreement is caused by unpredictable or indefinite events such as vibration or shock.

Thus, there is a need for providing an apparatus and method for correcting an image signal that includes variations in the levels of brightness of the colors of a pixel or image due to the movement of the image sensor from a correct image reading position. The color image processing apparatus and method, as described hereinafter, solves the problem caused by the disagreement of images in a relatively simple manner.

SUMMARY OF THE INVENTION

A general object of this invention is to provide an apparatus and method capable of correcting the level of brightness of color images delivered by an image sensor that has moved abruptly while reading a color image.

To accomplish the foregoing objective, a color image processing apparatus includes a color image processor, for use in a color image scanning device that delivers a color image signal representing the levels of brightness of the colors contained in the pixels of the manuscript being scanned, for correcting the brightness levels of the colors of the color image signal due to the disagreement of images, broadly comprising:

means for detecting the presence of correction objective pixels in a color image signal, means for calculating a correct brightness level for each detected correction objective pixel, and means for outputting a corrected color image signal by replacing the levels of brightness of the detected correction objective pixels in the color image signal with calculated corrected levels of brightness.

Preferably, the color image signal includes a standard color signal and at least one non-standard color signal with the image processor, comprising:

an array of registers for sequentially receiving and storing discrete brightness levels of a color image signal, a plurality of detectors for sequentially examining the level of brightness of each discrete level of brightness in a non-standard signal and for concurrently examining the brightness levels of the brightness levels adjacent the distinct brightness level being examined, a comparator for comparing the results obtained by the detectors and judging whether each discrete-examined brightness level represents a correction objective pixel, a first calculator for calculating a parameter representative of the brightness level of the standard color signal, a further calculator for each non-standard color signal, responsive to the detectors and the first calculator, for calculating a correct level of brightness for each level of brightness detected as representing a correction objective pixel, a multiplexer, responsive to the comparator, for selecting either a corrected non-standard color brightness level or the discrete examined level of brightness, and an output for outputting the brightness levels of a non-standard color signal selected by said selecting means and the corresponding brightness levels of the standard color signal.

In addition, the brightness levels of correction objective pixels for the disagreement of images can be accomplished by:

detecting the presence of correction objective pixels in a color image signal, calculating a correct brightness level for each detected correction objective pixel, and outputting a corrected color image signal by replacing the levels of brightness of the detected correction objective pixels in the color image signal with calculated corrected levels of brightness.

More specifically, the method for correcting the brightness levels of correction objective pixels for the disagreement of images in a color image signal comprises the steps of sequentially receiving and storing discrete brightness levels of a color image signal, said signal including a standard color signal and at least one non-standard color signal, examining each discrete brightness level of the non-standard color signal, determining whether an examined brightness level requires correction, calculating a correct brightness level for each brightness level determined to need correction, by using the levels of brightness on either side of the level of brightness being examined and the levels of brightness of the standard color signal, corresponding to the levels of brightness on either side of the non-standard color signal being examined, correcting the discrete brightness level determined to need correction, selecting either the corrected brightness levels or the examined level of brightness, and outputting the brightness levels of a non-standard color signal selected by said selecting means and the corresponding brightness levels of the standard color signal.

The invention itself with further objects and attendant advantages will best be understood by reference to the following detailed description taken in conjunction with the accompanying figures.

DESCRIPTION OF THE PREFERRED EMBODIMENT

Figure 1A:
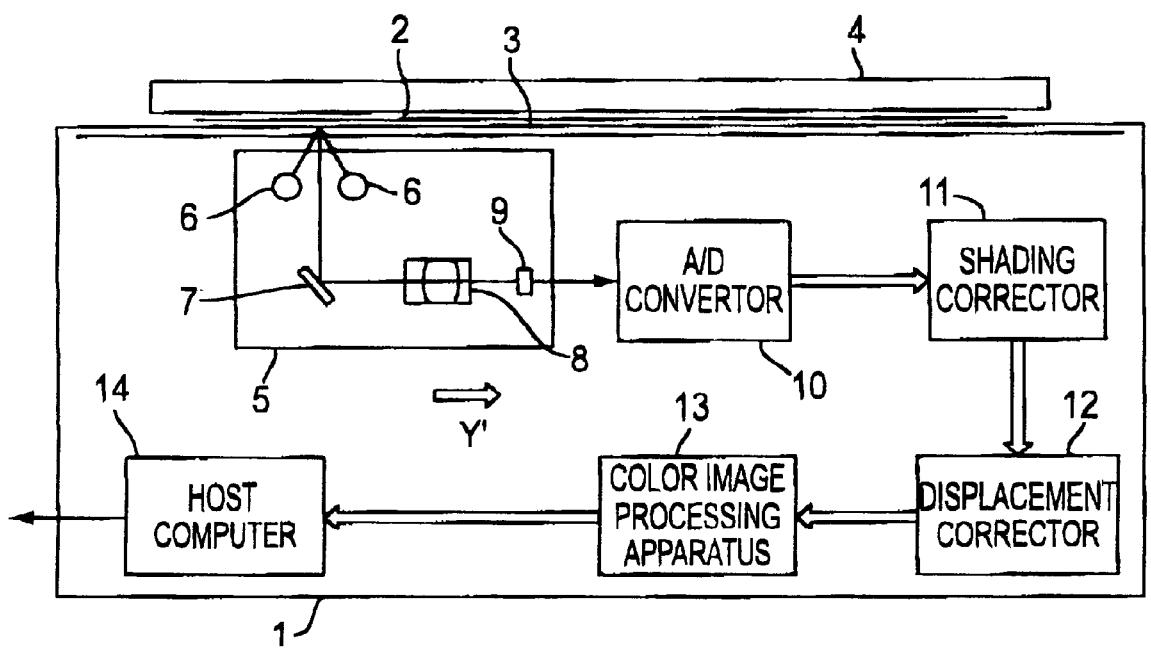
FIG. 1A is a block diagram of a color image scanner including the color image processing apparatus of the present invention.

As shown in the figures of the drawings, FIG. 1A is a block diagram of color image scanner 1, which includes the color image processing apparatus, or color image processor, 13 of the present invention.

Figure 1B:
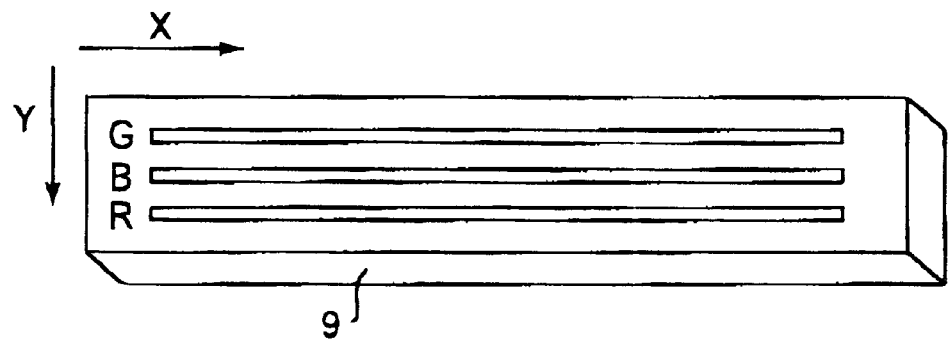
FIG. 1B is a perspective view of the line image sensor used in the color image scanner.

The color image scanning device or scanner 1 includes a manuscript 2, set on a platen glass 3 and covered by a manuscript cover 4. An optical box 5 contains the elements needed to scan the manuscript 2. The optical box 5 includes lamps 6, a mirror 7, a lens 8 and a line image sensor 9. As shown in FIG. 1B, the image sensor 9 includes three lines or rows of reading sensors in the form of charge-coupled-devices (CCDs) (not shown) Each line of CCDs is capable of reading the level of brightness of one of the primary colors depicted on the manuscript 2.

The optical box 5, and in particular the image sensor 9, is connected to an analog-to-digital (A/D) converter 10. The A/D converter 10 is connected to a shading correcting device, or shading corrector, 11, which in turn is connected to a displacement correcting device, or displacement corrector, 12. The color image processor 13 is connected between the displacement correcting device 12 and a host computer, or a host computer interface, 14.

In the operation of the color image scanner 1, the optical box moves in the direction of the arrow Y', that is, in the subsidiary sweep direction, exposing the manuscript 2 by the lamps 6. The reflection from the manuscript 2 is deflected by the mirror 7 and reaches the line image sensor 9 through the lens 8.

As shown in FIG. 1B, each line or row of CCDs is swept by an electric main sweep signal in the direction of X, that is, in the main sweep direction. Each row of CCDs delivers an image signal for each pixel in accordance with the sweep. The image signal represents the quantity of reflection from the manuscript 2 read by the CCDs. As each row of CCDs reads the level of brightness in terms of one of the primary colors contained in the pixels read, the image sensor 9 outputs an analog image signal that includes at least three signals representing the levels of brightness of the primary colors read by the CCDs. The analog image signal is a conversion of the quantity of the reflection or the levels of brightness of the colors on the manuscript 2.

The analog image signal is converted to a digital image signal by the A/D converter 10 Next, the digital image signal is passed through a shading corrector 11 that corrects the white and black levels in the signal. From the shading corrector 11, the digital image signal is passed through the displacement corrector 12 for correction for the displacement of the CCDs. Thereafter, the digital image signal is inputted to the color image processor 13 of the present invention. The digital image signal is processed to correct the disagreement of images in the color image processor 13 and outputted to the host computer 14.

The color image processor 13 receives the digital image signal, resolved into the three primary colors and corrects the signal for the disagreement of images by correcting the brightness level of the portions of the digital signal that were delivered by CCDs reading pixels that exist at the edge portion of a letter image on the manuscript 2.

Figure 2:
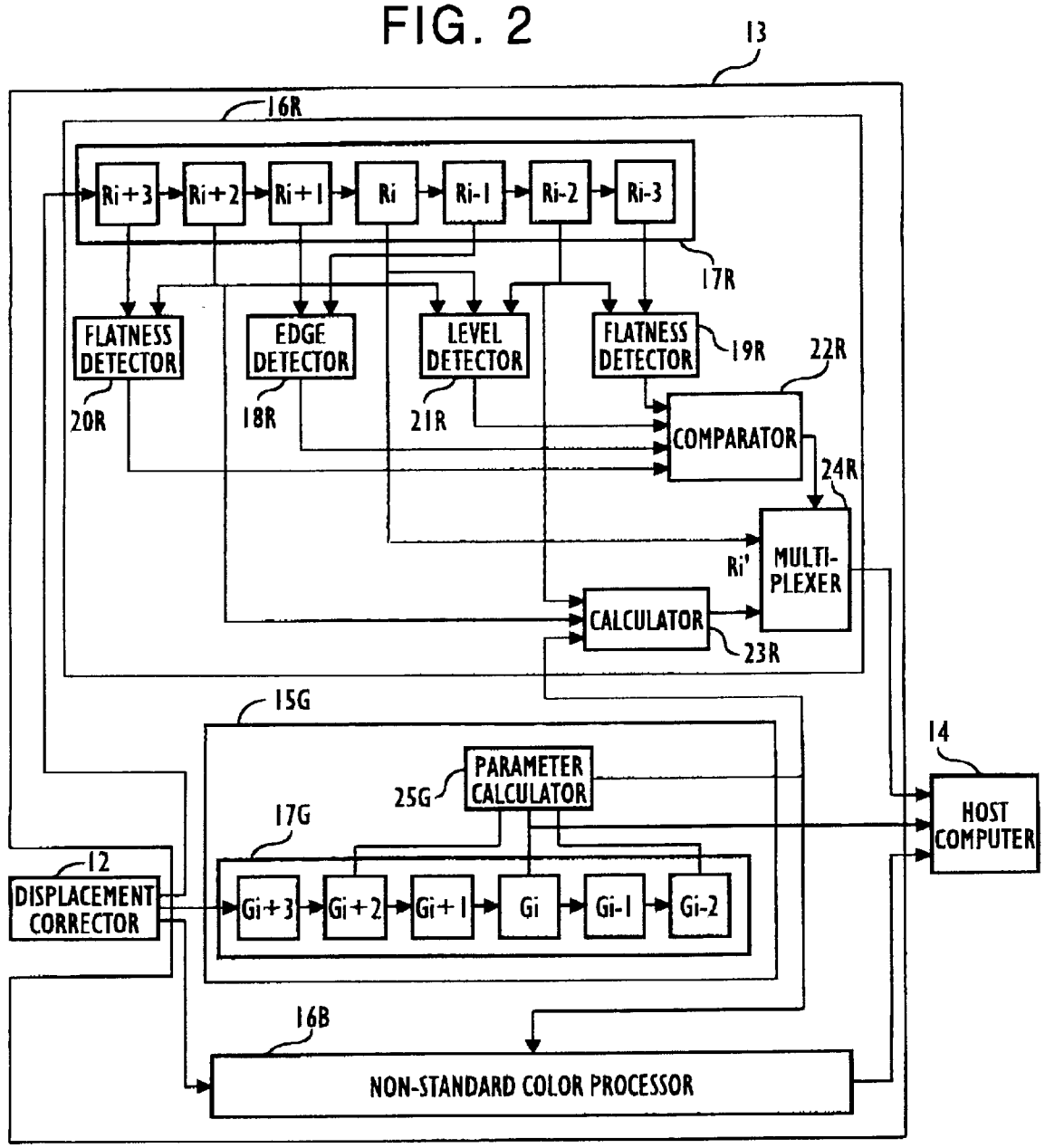
FIG. 2 is a block diagram of the color image processing apparatus of the present invention.
Figure 3A:
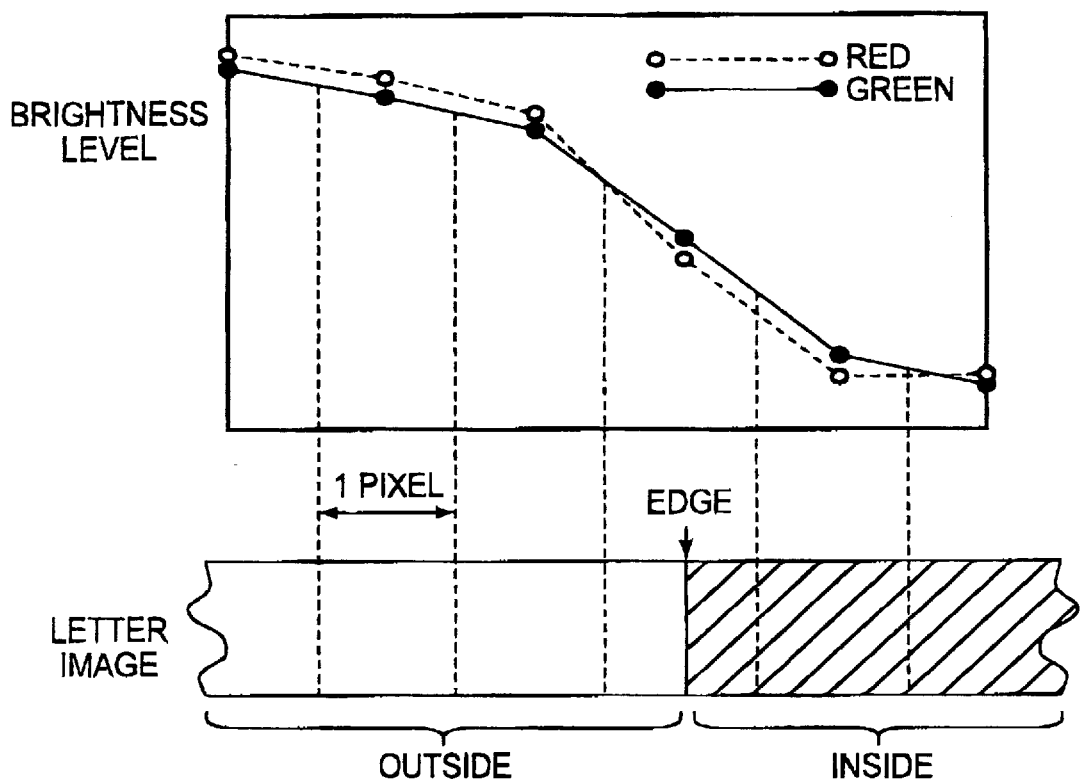
FIG. 3A shows the red and green brightness levels of the pixels near the edge portion of the letter image perpendicular to the main sweep direction, when the red and green reading sensors are in the same reading position in the main sweep direction relative to the pixels.
Figure 3B:
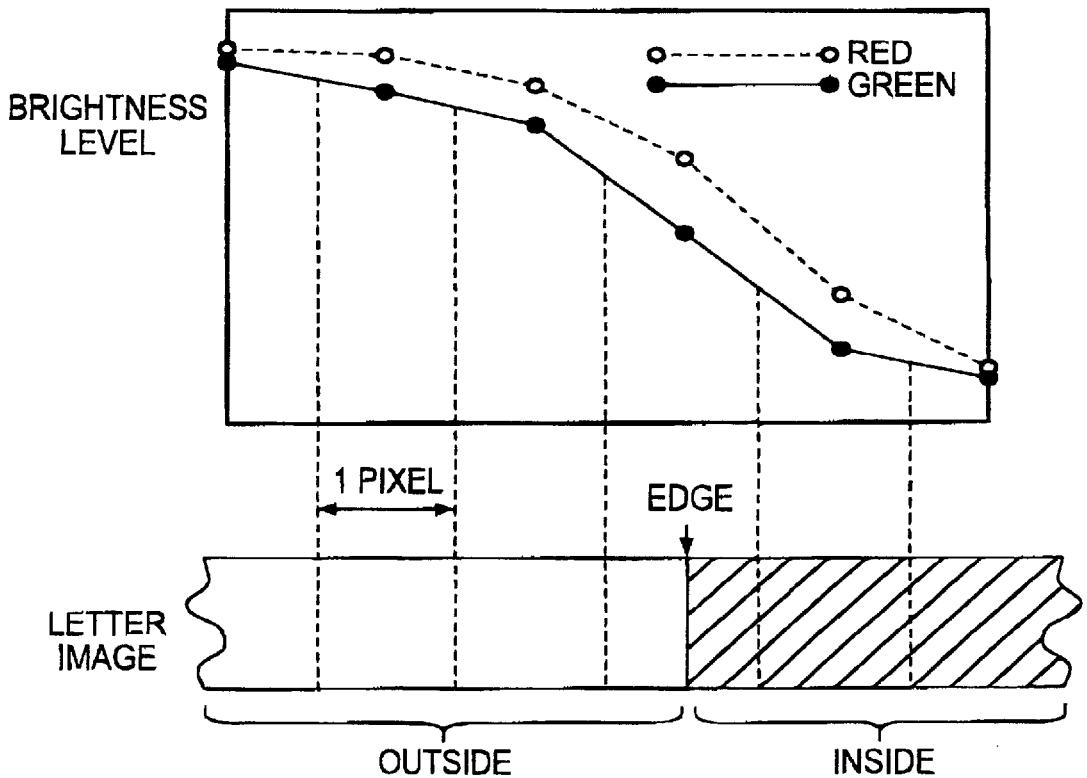
FIG. 3B shows the red and green brightness level of the pixels near the edge portion of the letter image perpendicular to the main sweep direction, when the red and green reading sensors moved from the correct reading position in the main sweep direction.

FIG. 2 is a block diagram of a color image processor 13 of the present invention. The processor 13 includes a pair of non-standard color processors 16R, 16B and a standard color processor 15G.

The non-standard color processor 16R includes a register array 17R, edge detecting means, or edge detector 18R, a pair of flatness detecting means, or flatness detectors 19R, 20R, level detecting means, or level detector 21R, disagreement judging means, or determining means or comparator 22R, calculating means, or calculator 23R, and a multiplexer or selecting means 24R. The non-standard color processor 16B contains similar components.

The standard-color processor 15G includes a register array 17G, and parameter calculating means, or a parameter calculator 25G.

In the embodiment illustrated in FIG. 2, the color image processor 13 receives a digital image signal from the displacement corrector 12. The digital signal comprises three image signals, one for each primary color, with each image signal corresponding to the level of brightness of a primary color read by a particular line or row of CCDs in the image sensor 9.

At the outset, one of the image signals is defined as a "standard color" image signal. The two other signals are defined as "non-standard color" image signals. Also, a pixel that exists at an edge portion of a letter image is defined as a "correction objective pixel."

In the color image processor 13, only the signals identified as non-standard color signals are corrected for the disagreement of images. The input image signal, defined as a standard color signal, is not corrected for the disagreement of images. In this embodiment, the image signals representing the red and blue levels of brightness are defined as the non-standard color signals R, B. The image signal representing the green levels of brightness is defined as the standard color signal G.

The following description is an overview of how the color image processor 13 corrects the digital image signal received from the displacement corrector 12 for the disagreement of images.

(1) Image signals, defined as non-standard color signals (R, B) and an image signal, defined as a standard color signal (G) are received by the color image processor 13.

(2) The individual or discrete portions of a non-standard color signal (R) are sequentially stored in the register array 17R and individually examined to detect the presence of correction objective pixels; pixels that exist at an edge portion.

(3) Concurrently with the storing and examining sequence, the correct level of brightness is calculated by using the levels of brightness obtained from the pixels existing on either side of the pixel under review, and by using the level of brightness of the pixels in the standard color image signal corresponding to the pixels adjacent the pixel under review.

(4) The brightness level of any detected correction objective pixels is corrected by using the calculated level of brightness.

(5) The non-standard color image signal (B) is processed simultaneously with the second, third and fourth steps described above.

(6) A digital output signal, including the standard color image signal, and two non-standard color signals corrected for the disagreement of images, is then outputted to the host computer 14.

Before describing the correction process in more detail, the following information is provided:

(1) The corrected level of brightness does not depend on color.

(2) The levels of brightness of the pixels inside of a letter image are almost constant.

(3) The levels of brightness of the pixels outside of a letter image are almost constant.

A more detailed description of the operation of the color image processor 13 follows. In this description, as above, G is defined as a standard color, and R and B are defined as non-standard colors.

The description begins with the following expression (1):

$$(Rx-Rk): (Rw-Rk)=(Gx-Gk): (Gw-Gk) \qquad (1)$$

wherein,

Rw; brightness level of R of the pixel outside of the letter image.

Gw; brightness level of G of the pixel outside of the letter image.

Rk; brightness level of R of the pixel inside of the letter image.

Gk; brightness level of G of the pixel inside of the letter image.

Rx; brightness level of R of the pixel at the edge portion of the letter image.

Gx; brightness level of G of the pixel at the edge portion of the letter image.

Equation (1) is true if the sensors reading the level of brightness of the pixels are in the same reading position. Specifically, the expression (1) is true if there is no disagreement of the R image and the G image.

Accordingly, $$Rx=Rk+(Gx-Gk)(Rw-Rk)/(Gw-Gk) \qquad (2)$$

The input image signal received by the color image processor 13 is sequentially stored in the register array 17R, 17G as shown in FIG. 2.

With reference to the register arrays, the register array 17R includes the designations R(i+3), R(i+2), R(i), R(i−1), R(i−2), and R(i−3).

At any given time in the sequence of storing the R image signals, R(i) represents the image signal of the pixel that is being examined to determine, decide, detect, or judge whether the image signal is that of a correction objective pixel. R(1+n) merely represents the next image signal in the sequence. In this depiction, R(1+n) represents the pixel to the left of the pixel R(i). R(1−n) represents the image signal the preceded the image signal R(i). In the same manner, R(1−n) represents the pixel to the right of the pixel R(i). The same is true of the symbols for the G image signal shown in the register array 17G.

Accordingly, the R input image signal comprises a plurality of values, one for each of the pixels read by the R line of CCDs. The R digital image signal comprises a sequence of readings from R(i+n) to R(i+n) and represents the red brightness levels of the red color R in the pixels. All of these R values of the pixels are sequentially stored in the register array 17R. Similarly, the G input image signal comprises a sequence of readings, corresponding to the brightness levels read by the G line of CCDs and identified as G(i+n) to G(i−n). The sequence of G readings is stored in the register array 17G.

Next, the examination of the level of brightness Ri, appearing in the Ri register, to determine whether Ri represents a correction objective pixel, is described. (Hereinafter, the level of brightness of the pixel appearing in the R(i) register will be called "pixel Ri.") If pixel Ri is determined to be a correction objective pixel, its level of brightness will be corrected for the disagreement of images. If the pixel Ri is not judged to be a correction objective pixel, pixel Ri will not be corrected. A correction objective pixel represents the level of brightness of a pixel that exists at the edge portion of a letter image.

In order to determine whether pixel Ri is a correction objective pixel, three simultaneous examinations are performed. These examinations are performed, in the case of pixel Ri, by the edge sensor means 18R, the flatness detector means 19R, 20R, the level detector means 21R, and the disagreement judging means 22R.

Examination 1

First, the pixel Ri is examined, by the edge detecting means 18R, to determine whether or not pixel Ri exists at an edge portion. Expression (3) is used in making the determination $$\text{abs }(R(i-1)-R(i+1))>T1 \qquad (3)$$

wherein, abs is an absolute value, and

T1 is a threshold values

If the expression (3) is true, that is, the change of the brightness level of the pixels is abrupt near the pixel Ri, then said pixel Ri is judged as existing at an edge portion of the image.

Threshold value T1 can be set at, for example 80, on a 256 scale of the 8 bits, that is, the brightness level is 0 when entirely dark and 256 when the level is the brightest.

Examination 2

The changing rate of the brightness levels of the pixels, which exist to the right of and near the pixel Ri or to the left of and near the pixel Ri, are examined by the flatness detecting means 19R, 20R respectively. Expressions (4) and (5) are used in the examination.

$$\text{abs }(R(i-2)-R(i-3))<T2 \qquad (4)$$

$$\text{abs }(R(i+2)-R(i+3))<T3 \qquad (5)$$

If the expressions (4) and (5) are true, the changing rate of the brightness levels is flat. That is, the pixel R(i−2) and the pixel R(i−3) exist at the inside (or outside) of the letter image and the pixel R(i+2) and the pixel R(i+3) exist at the outside (or inside) of the letter image. The threshold values T2 and T3 are set at, for example 20, on a 256 scale of the 8 bits.

Examination 3

The change of the brightness level of the pixels neighboring the pixel Ri is examined to determine whether the level changes to one direction or not by the level detecting means 21R. Expression (6) is used in this examination.

$$R(i-2)<Ri<R(i+2) \text{ or } R(i-2)>Ri>R(i+2) \qquad (6)$$

The disagreement judging means 22R compares the results of the three examinations and judges whether all of the expressions from (3) to (6) are true in the examinations mentioned above. If all the expressions are true, disagreement judging means 22R judges that the pixel Ri exists at an edge portion in the pixel read and is a correction objective pixel in the correction for the disagreement of images.

On the other hand, if one or more of the expressions from (3) to (6) is not true in the examinations mentioned above, disagreement judging means 22R judges that the pixel Ri is not a correction objective pixel in the correction for the disagreement of images.

Multiplexer 24R selects the calculating means 23R, which calculates the corrected brightness level and corrects the brightness level of pixel Ri, when the pixel Ri is judged to be the correction objective pixel. The corrected brightness level, termed Ri', is outputted to the host computer interface 14.

The corrected brightness level Ri' is obtained from the expressions (7) and (8) by the calculating means 23R, which is obtained by changing Rw, Rk, Rx, Gw, Gk, Gx in expression (2) to R(i+2), R(i−2), Ri, G(i+2), G(i−2), Gi respectively. Accordingly, $$Ri'=A(R(i+2)-R(i-2))+R(i-2) \qquad (7)$$

where A is determined by the following expression (8):

$$A=(Gi-G(i-2)/(G(i+2)-G(i-2)) \qquad (8)$$

Proportional parameter A is calculated by the parameter calculating means 25G.

In the event pixel Ri is judged to not be a correction objective pixel, the brightness level of pixel Ri is not corrected. Rather, the same level of brightness, as that of the pixel Ri inputted to the non-standard color processor 16R, is outputted to the host computer 14 through the selection action of the multiplexer 24R.

Thereafter, the contents of the registers in the register array 17R are shifted by one pixel, and the three examinations are repeated.

As mentioned above, each pixel in the image signal of the non-standard color is examined successively to determine whether or not the pixel Ri is a correction objective pixel for the disagreement of images.

The same examinations performed on the R pixels are performed concurrently on the B pixels. Since the structure and process for examining any non-standard color signal is the same as for the R pixels, the block 16B, depicting the blue non-standard color processor, is left blank and no explanation of the process is provided.

The correction for the disagreement of images is not performed on the standard color G. The brightness level Gi is outputted to the host computer interface 14.

The correction for the disagreement of images in the subsidiary direction is obtained in the same manner as described above for the main sweep direction.

Variations on the embodiment described above are possible. For example, in the foregoing embodiment, a line image sensor 9, having the three lines or rows of CCDs is used. However, a dichroic mirror and a monochroic sensor, or other kind of image sensor could be used instead of the sensor with CCDs. Also, in this embodiment, the image signal is resolved into three primary colors of G, B, R. However, the correction for the displacement of images at the multi-band color of two colors or of four colors or more is also possible by the present invention.

The above-described invention provides a number of significant advantages. According to the invention, unwanted movements of an image sensor while scanning a manuscript thereby, causing the different color-sensitive reading elements in the sensor to be moved from the correct position when reading the same elemental image or pixel, are corrected by correcting the levels of brightness delivered from the pixels existing at an edge portion.

Thus, the present invention provides an apparatus and method for correcting an image signal that includes variations in the levels of brightness of the colors of a pixel or image due to the movement of the image sensor from a correct image reading position. The color image processing apparatus and method, as described hereinafter, solves the problem caused by the disagreement of images in a relatively simple manner.

The present invention may be embodied in other specific forms without departing from the spirit or essential characteristics thereof. The present embodiment is therefore to be considered in all respects as illustrative and not restrictive, the scope of the invention being indicated by the appended claims rather than the foregoing description, and all changes that come within the meaning and range of equivalency of the claims are therefore intended to be embraced therein.

What is claimed is:

1. A color image processing apparatus, for correcting the brightness levels of correction objective pixels for the disagreement of images in a color image signal, said signal including a standard color signal and at least one non-standard color signal, with each signal representing the levels of brightness of a color contained in the pixels of a scanned manuscript, comprising:

an array of registers for sequentially receiving and storing discrete brightness levels of a color image signal, a plurality of detectors for sequentially examining the level of brightness of each discrete level of brightness in a non-standard signal and for concurrently examining the brightness levels adjacent the discrete brightness level being examined, a comparator for comparing the results obtained by the detectors and judging whether each discrete-examined brightness level represents a correction objective pixel, a first calculator for calculating a parameter representative of the brightness level of the standard color signal, a further calculator for each non-standard color signal, responsive to the detectors and the first calculator, for calculating a correct level of brightness for each level of brightness detected as representing a correction objective pixel, a multiplexer, responsive to the comparator, for selecting either a corrected non-standard color brightness level or the discrete examined level of brightness, and an output for outputting the brightness levels of a non-standard color signal selected by said selecting means and the corresponding brightness levels of the standard color signal.

2. The color image processing apparatus according to claim 1, wherein said plurality of detectors include, an edge detector for detecting whether the level of brightness being examined represents a pixel existing at an edge portion, a pair of flatness detectors for detecting whether the changing rate of the brightness levels to the left and right of the discrete brightness level being examined remains flat, and a level detector for detecting whether the brightness levels neighboring the discrete brightness level being examined change in one direction or another.

* * * * *